(12) United States Patent
Crain et al.

(10) Patent No.: US 7,739,801 B1
(45) Date of Patent: Jun. 22, 2010

(54) UNDERCUT SAW

(75) Inventors: Lance D. Crain, Fremont, CA (US);
Tan D. Nguyen, Milpitas, CA (US)

(73) Assignee: Crain Cutter Company, Inc., Milpitas, CA (US)

( * ) Notice: Subject to any disclaimer, the term of this patent is extended or adjusted under 35 U.S.C. 154(b) by 195 days.

(21) Appl. No.: 11/075,873

(22) Filed: Mar. 9, 2005

Related U.S. Application Data

(60) Provisional application No. 60/623,321, filed on Oct. 29, 2004.

(51) Int. Cl.
*B23D 45/00* (2006.01)
(52) U.S. Cl. .............................. 30/371; 30/373; 30/390; 30/166.3
(58) Field of Classification Search ........... 30/388–394, 30/373, 166.3, 370, 371, 374, 375, 377, 505; 144/136.95
See application file for complete search history.

(56) References Cited

U.S. PATENT DOCUMENTS

| | | | | |
|---|---|---|---|---|
| 2,610,658 | A * | 9/1952 | Koeling | 30/373 |
| 3,716,917 | A * | 2/1973 | Ruben | 30/391 |
| 4,555,849 | A * | 12/1985 | Ando et al. | 30/388 |
| 5,784,789 | A | 7/1998 | Vargas | 30/388 |
| 5,967,013 | A | 10/1999 | McKenzie et al. | 83/483 |
| 5,974,674 | A | 11/1999 | Kelly | 30/391 |
| 6,588,111 | B2 | 7/2003 | Williams | 30/391 |
| 6,678,960 | B2 * | 1/2004 | Williams | 30/391 |

OTHER PUBLICATIONS

U.S. Appl. No. 09/976,483 (incl. drawings and prior art references), "Undercut Saw Depth Gauge", filed Oct. 12, 2001, Assignee: Crain Cutter Co., Inventor: Tan D. Nguyen.

* cited by examiner

*Primary Examiner*—Boyer D Ashley
*Assistant Examiner*—Omar Flores-Sánchez
(74) *Attorney, Agent, or Firm*—Schneck & Schneck; David M. Schneck

(57) ABSTRACT

An undercut saw including a housing, a motor within said housing, a drive shaft rotated by said motor, and a blade mount mechanically linked to said shaft such that a circular saw blade mounted on said mount is rotated when the motor rotates the drive shaft. A fixed blade guard circumscribes a portion of the blade and allows selectable height adjustment of the blade. A stabilization bar on the fixed blade guard may be extended to make the device more stable. On the underside of the fixed blade guard a dust channel allows dust to be swept by the rotating blade into a dust port. The dust channel allows positioning of the dust port away from the leading edges of the fixed blade guard.

2 Claims, 14 Drawing Sheets

UNDERCUT SAW

CROSS-REFERENCE TO RELATED APPLICATION

This application claims priority from U.S. Provisional application No. 60/623,321, filed Oct. 29, 2004.

TECHNICAL FIELD

This invention relates generally to power tools and more specifically to undercut saws.

BACKGROUND OF THE INVENTION

When installing flooring it is at times desirable to have the edges of the flooring extend underneath baseboards and/or walls. To fit the flooring into this area, the wall and/or baseboard needs to be undercut at a specific height to allow the flooring to be installed underneath. Although it is possible to perform the undercutting by hand, this task is laborious and it is preferred to use a power tool. An undercut saw may be specifically designed to undercut a wall for the installation of flooring. This requires a specialized tool.

FIGS. 1 and 2 show two available undercut saw designs. FIG. 1 illustrates one of the earliest models, designed by Crain Cutter Company (Milpitas, Calif.). In this tool, an external housing 2 encloses a motor 3. Motor 3 drives a drive shaft 4. Gears at an end of armature drive shaft 4 mesh with gears on parallel spindle shaft 5 rotating shaft 5. A circular saw blade 1 is mounted on a blade mount (not visible) at the end of spindle shaft 5. The blade mount is a separate part which in conjunction with a fastener mechanically couples the blade to the spindle. Blade 1 is mounted such that the blade is held substantially parallel to the floor when the tool is positioned on the floor surface. When used herein the term circumscribe shall mean the amount of the outer circumference or toothed edge of the blade which is covered by a fixed blade guard. This fixed blade guard is attached to housing 2 and exposes less than 180 degrees of the blade for cutting. A depth gauge 9 is mounted on fixed blade guard 10 such that the depth of a cut may be selected by a user. Handles 6, 7 are used to grip the tool. The tool is activated by switch 11, in the underside of handle 7.

Similarly in the device shown in FIG. 2, a housing 2 encloses a motor 3 that rotates an armature drive shaft 4. At a distal end of shaft 4 is a gear that engages a gear on a parallel spindle shaft 5. At a distal end of spindle shaft 5 is a blade mount (not visible) for mounting a circular saw blade 1. The blade mount is a separate part which in conjunction with a fastener mechanically couples the blade to the spindle. Again the blade is essentially parallel to the floor. A fixed blade guard 10 extends around the circumference of blade 1, exposing less than 180 degrees of the blade. A depth gauge 9 allows the user to set the depth to which blade 1 will cut. Handles 6, 7 are gripped by a user to direct the tool. A switch 11 on handle 7 allows activation of the tool.

In the devices illustrated in FIGS. 1 and 2, the motor is upright and the armature drive shaft and the spindle shaft are in parallel orientation.

With reference to FIG. 3, an undercut saw employing an alternative configuration of the armature shaft and spindle shaft is shown. Again, outer housing 2 contains a motor 3 that rotates an armature drive shaft 4. Again at a terminal end of drive shaft 4 is a gear which engages a gear on spindle shaft 5. At a distal end of spindle shaft 5 is a blade mount (not visible) that allows mounting of a circular saw blade 1. The blade mount is a separate part which in conjunction with a fastener mechanically couples the blade to the spindle. In this embodiment, the armature drive shaft 4 and spindle shaft 5 are in perpendicular orientation. As in the prior tools, a depth gauge 9 is mounted to a fixed blade guard 10 to allow a user to selectively limit the depth of the cut. A handle 7 is used to direct the motion of the tool. A switch 11 on the top of the tool allows activation of the tool.

In FIG. 4, another undercut saw is illustrated. In this device, housing 2 holds a motor that turns drive shaft 4. In this embodiment, there is no spindle gear attached to shaft 4. Thus, the blade mount (not visible) for blade 4 is mechanically linked directly to drive shaft 4. On blade guard 10 there is a dust port 10a that allows dust to be channeled away from blade 1. Rounded handles 6, 7 are mounted on fixed blade guard 10. Depth gauge 9 is permanently mounted on fixed guard 10.

A number of these prior art devices are shown in U.S. Pat. Nos. 5,784,789; 5,967,013; 5,974,674 and 6,588,111 and U.S. patent application Ser. No. 09/976,483, all incorporated by reference herein.

The prior art devices have a number of drawbacks. First, the devices of FIGS. 1, 2, and 4 are unable to undercut an inside corner, as shown in FIGS. 1A, 2A, and 3A, respectively. As these saws move along a wall, the side of the saw will contact an adjacent wall before the blade reaches the corner. Also, in order to undercut an inside corner, more than 180 degrees of the circumference of the blade must be exposed, and none of these devices have this design. Thus, for two reasons, they will not undercut in the inside corner, and so the work must be done by hand. With the saw of FIG. 1, handle 6, depth gauge 9, and blade guard 10 all limit the ability to undercut inside corners. Side handle 6 and depth gauge 9 may both be removed although some time is required to remove and replace the handle. However this does not allow the saw to undercut inside corner areas because the side of the blade guard still contacts the wall, and because less than 180 degrees of the circular saw blade is exposed for undercutting.

With regard to the device of FIG. 2, the fixed blade guard is comprised of two parts, a first fixed blade guard 10 with a substantially flat top face 13 and a semi-circular back edge 14 protruding downward, which fits inside a second semi-circular skirt 15. The two circular surfaces telescope and provide a means of blade height adjustment. Skirt 15 is adjustably fixed to fixed blade guard 10 by means of bolts 16. The outside diameter of skirt 15 prevents this saw from undercutting an inside corner. Fixed blade guard 10 circumscribes more than 180 degrees of the circumference of the blade which also prohibits the blade from cutting into inside corner areas. With respect to the device of FIG. 4, both the fixed blade guard 10 and the side-mounted dust port 10a prevent the tool from accessing an inside corner area.

As shown in FIG. 3A, the device of FIG. 3 does allow undercutting of an inside corner. In this device the perpendicular orientation of the armature drive shaft and spindle shaft is more compact and allows the blade to be mounted at a more forward location on blade guard 10. Furthermore blade guard 10 is relieved along its forward edge to expose more than 180 degrees of the circumferential edge of blade 1. Blade guard 10 consists of fixed blade guard 14 with semi-circular downwardly protruding back edge 15 that fits within semi-circular height adjustment skirt 16. The two circular surfaces telescope and provide a means of height adjustment. Fixed guard 14 is adjustably fixed to skirt 16 by bolts 13.

The long back end of housing 2 provides an advantage in that it tends to counterbalance the weight of the guards and blade, preventing this kind of saw from tipping. However, this long back end makes the tool more difficult to use in tight spaces, such as closets. Furthermore, the drive system consisting of a spindle gear perpendicular to an armature gear is not effective for generating low RPMs or high torque. Thus this type of saw can tend to bog down and overheat in operation.

With respect, the device of FIG. 1, and of FIG. 4 have a fixed blade guard which consists of a single semi-circular part with a downwardly protruding back edge. However, more recent designs such as the devices of FIGS. 2 and 3 have a fixed blade guard which is mechanically coupled to a height adjustment skirt. When used herein, the term fixed blade guard may refer to either a) a device with a fixed blade guard consisting of a single part or b) a device with a fixed guard and a height adjustment skirt. Additionally, a feature described as being part of or attached to the height adjustment skirt may be considered as part of the fixed blade guard, as this is one assembly designed to perform the function of a fixed blade guard.

Some of the features, such as the dust port, would be more useful if these features could be accommodated into a device that was able to undercut inside corners and could also provide more adequate torque.

In addition to the problem of cutting the inside corner, all of the prior devices have less than ideal handles. The handles of FIG. 1 are sufficient for control of the tool and allow sufficient pressure for direction of the tool. However if the user is in a squatting position near the floor (the preferred position for use of this tool), the wrist of the user is bent back at an angle to grip handle 7. In addition, the position of the handles tends to make the user put downward pressure on the tool, making the desired sideways motion less comfortable. For the undercut saw in FIG. 2, the handle position is also poor. Handle 7 requires that a user grip the handle such that a trigger finger is on switch 11. This requires that in use the user bend one wrist back at an uncomfortable angle. This again reduces the efficiency of the tool.

In the undercutting saw of FIG. 3, only a single handle is included. The user must keep a separate hand on the housing of the tool. The handle 7 is attached to the housing by a pair of bolts 12 that allow the handle to be adjustably positioned. However this adjustable positioning makes the handle prone to rotate forward, especially as force on the handle is exerted during cutting. In addition, the handle is gripped from the top, which is a less than efficient position for the desired sideways movement of the tool in operation. During use of the device housing 2 is heated by motor 3 and becomes uncomfortable as a gripping surface. To effectively direct the tool during operation, most of the force directing the tool is from the user gripping the sides of housing 2 and moving the tool along the wall. Finally, the handles 6, 7 of FIG. 4 are also awkward, requiring a user to grip ball like structures. These handles are gripped from the top requiring a clawlike extension of all fingers over the rounded handles.

Placement of the switch is also a concern. Ideally, the switch would be placed such that it can be easily accessed by the user's trigger finger, allowing rapid shutoff of the tool should the need arise. In FIG. 1, the placement of trigger switch 11 on handle 7 requires the user to grip handle 7 directly from above. This tends to put downward pressure on the tool, which makes the desired sideways motion of the tool along a wall more difficult.

In FIG. 2, the orientation of the handle 7 is parallel to the floor. When the user grasps this handle their wrist is naturally bent. Thus as the user attempts to apply pushing force on handle 7 the sensation is one of having one's wrist bent further backwards, which is quite uncomfortable. Furthermore, to activate the trigger-type switch 11 the user must pull it with the trigger finger. Thus, the hand is pushing forward while also pulling a switch backward at the same time, which is awkward. Moreover, the added tension in the wrist created by the pulling action of the trigger finger creates even greater discomfort in the wrist.

When using the device of FIG. 3, the user grips handle 7 with one hand and places the other hand on the housing. The spring loaded switch 11 is activated by the placing a thumb on the trigger and pushing forward, and deactivated by removing the thumb. Because the thumb is not on the housing, it does not assist in gripping, which is not effective for transferring force. In FIG. 4, the switch 11 for the device is on the housing, not on the handles 6, 7. This means that to turn off the device a user must let go of at least one handle. This makes shutting off the device during an emergency take more time. This is not ideal during an emergency, especially if the user has lost some control of the tool.

Many features which are preferred in the design of an undercutting saw make it likely to tip over, which is a safety hazard. In order to expose as much of the forward circumference of the blade as possible, it is preferable to mount the motor housing as far forward as possible on the fixed blade guard. Thus, the bulk of the weight is centered on a cantilevered area. Furthermore, recent designs which can fully undercut inside corners require that more forward support from the fixed blade guard be removed. Lastly, in a device with a motor that employs parallel drive and spindle shafts, the motor is taller and thereby generates more leverage that tends to cause tipping. However, a device with a parallel drive and spindle shaft is preferred due to the greater torque these motors generate from lower RPM.

It is an object of the invention to provide a undercut saw with improved, ergonomic handles.

It is a further object to provide an undercut saw with a dust port that still allows inside corner cutting.

It is a further object of this invention to provide an undercut saw with a depth gauge with an operating surface that positions the saw for optimal utilization of its dust control port.

It is a further object of this invention to provide an undercut saw with a drive shaft parallel to a spindle shaft with a fixed blade guard which can expose greater than 180 degrees of the blade circumference.

It is a further object of this invention to provide a saw with a stabilizer that can help to reduce tipping.

SUMMARY OF THE INVENTION

The above objects have been achieved using an undercut saw that includes a housing, a motor contained within the housing, a shaft rotated by said motor, a blade mount mechanically linked to said shaft, and a fixed blade guard joined to said housing. In one embodiment the saw includes a retractable stabilization bar extending from said fixed housing. In another embodiment the device includes a dust port mounted on said fixed housing, with a dust channel on the underside of the fixed blade guard leading to the dust port. In either of these two embodiments, the saw may include a number of features including:

1. An armature shaft which is driven by a motor and is joined by a gear coupling to a spindle shaft, the axis of the spindle shaft being parallel to the axis of the armature shaft.

2. A depth gauge removably mounted on said fixed blade guard, the depth gauge having a surface that positions the saw optimally for use of the dust control port.

3. A retractable blade guard mounted on the fixed blade guard.

4. A fixed blade guard shape that allows exposure of greater than 180 degrees of the circular saw blade.

5. A pair of ergonomic handles on said housing.

DETAILED DESCRIPTION OF THE INVENTION

The present invention has a number of new and useful features not currently available in undercutting saws. Stability is important for undercut saws. If the saw in use tips forward or backward, it can result in damage to the wall or floor and possibly injure the user. Two design features, when utilized, further add to this instability. One is the incorporation of a fixed blade guard housing exposing a portion of the circular saw blade that is greater than 180 degrees of the saw blade's circumference. The fixed blade guard acts as the stable base for the saw. Reducing this circumferential area of the fixed blade guard makes the tool more likely to tip. The use of parallel armature and spindle shafts further leads to the adoption of a taller tool that is more likely to tip. A first aspect of the present invention utilizes a stabilization bar that extends from the fixed blade guard. This stabilization bar may be used in any undercut saw regardless of the mechanism in which the drive shaft is mechanically joined to the blade and regardless of whether more or less than 180 degrees of the blade is exposed.

Figure 1:
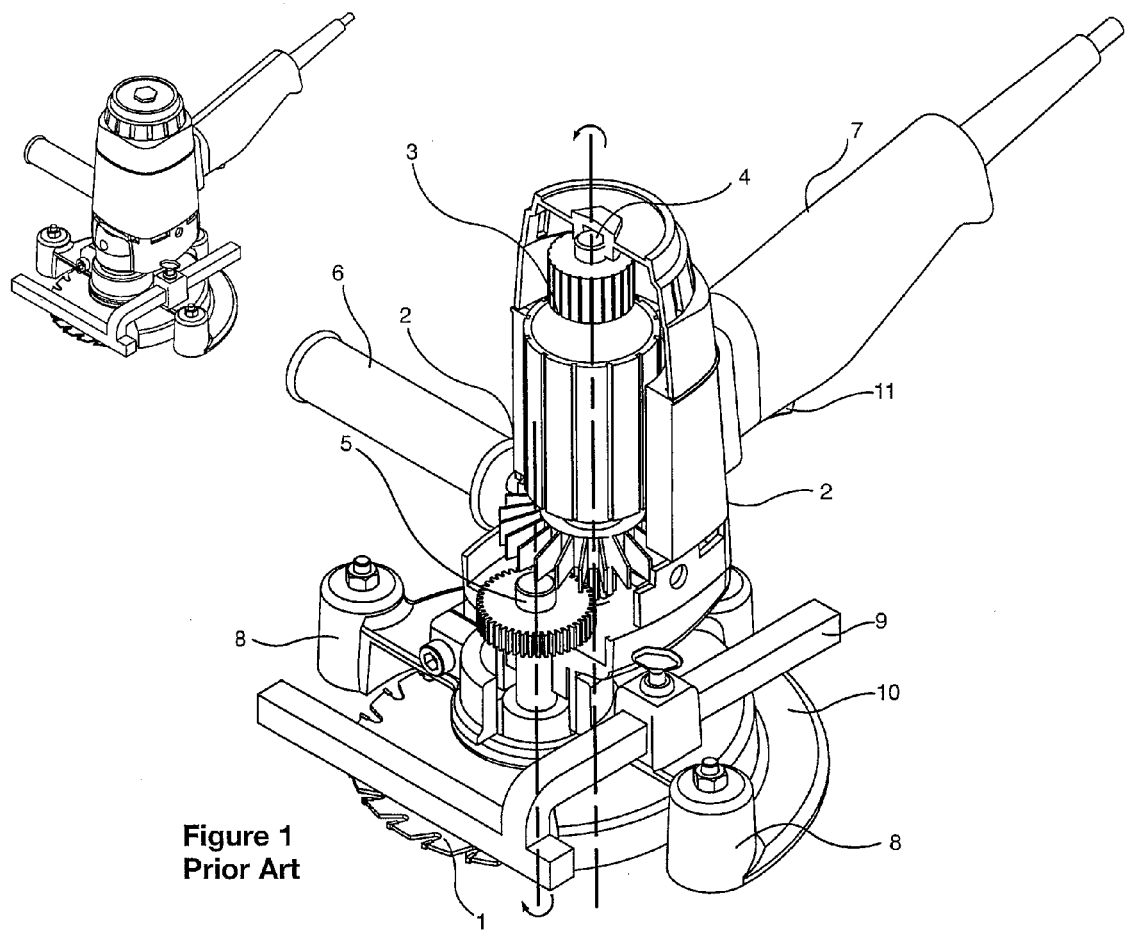
FIG. 1 is a perspective view of a first known undercut saw with a partial cutaway of the housing to show the parallel drive and spindle shafts.
Figure 1A:
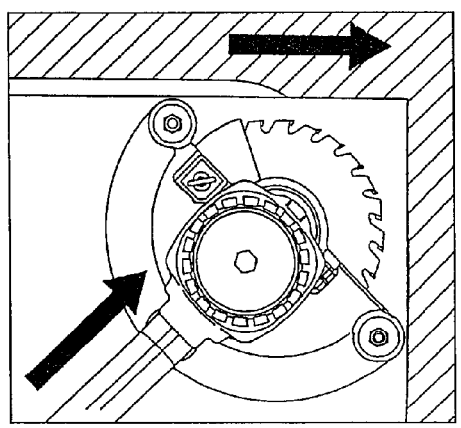
Figure 2:
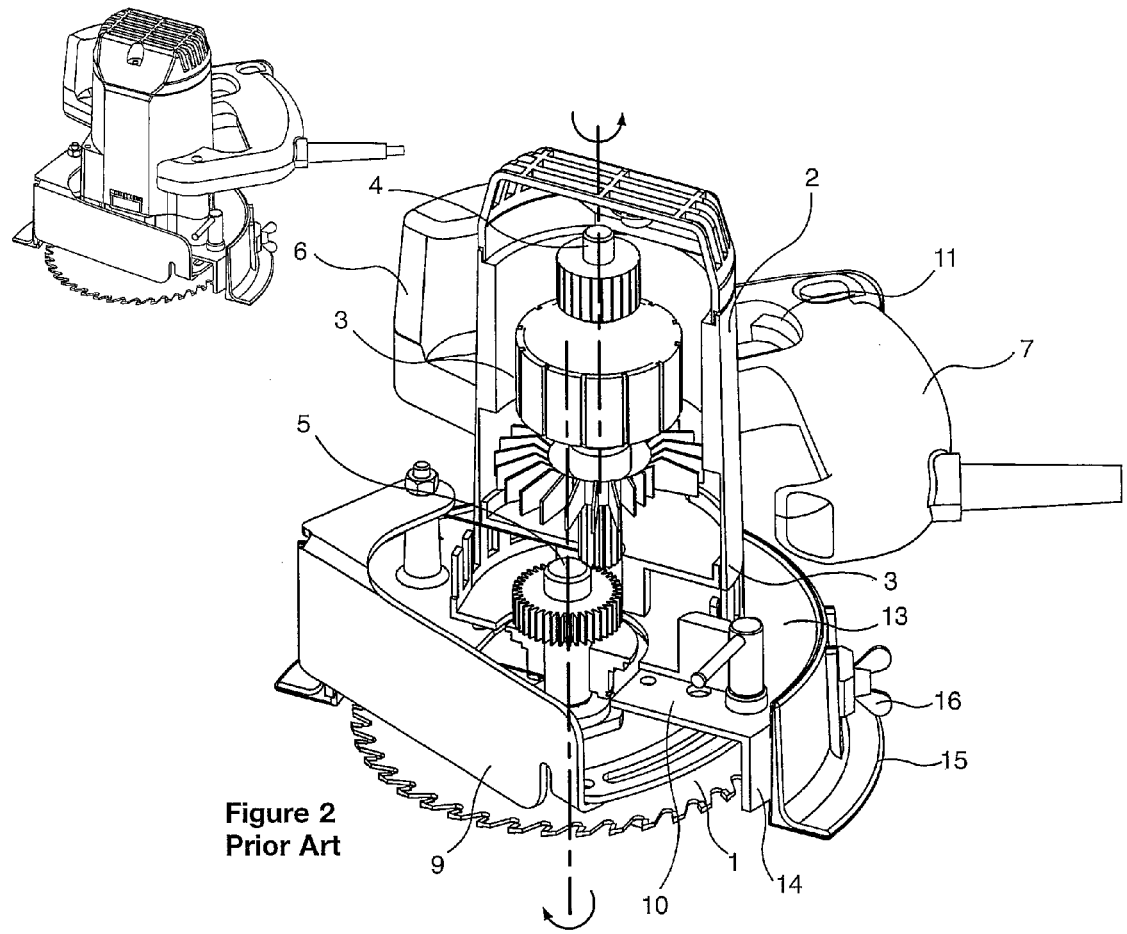
FIG. 2 is a perspective view and partial cutaway of an alternative prior art device employing parallel spindle and drive shafts.
Figure 2A:
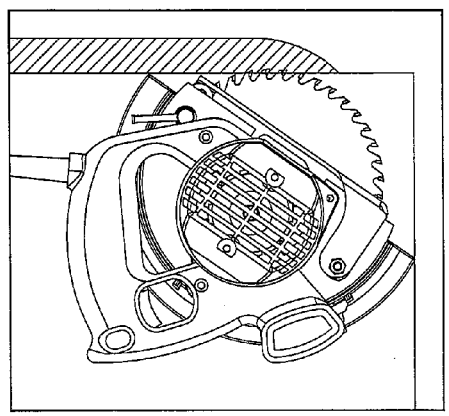
Figure 3:
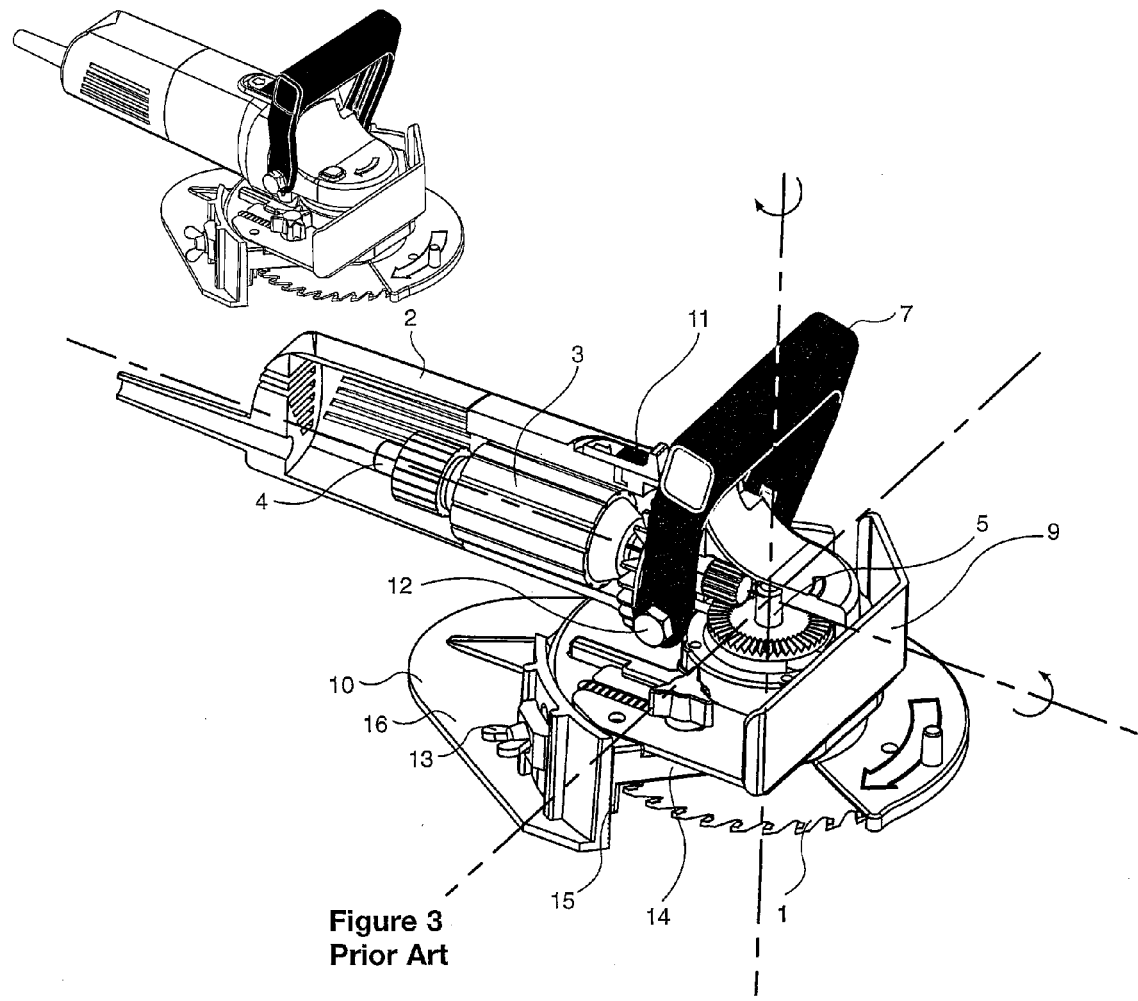
FIG. 3 is a perspective view with partial cutaway showing an undercut saw employing an armature drive shaft that is perpendicular to its spindle shaft.
Figure 3A:
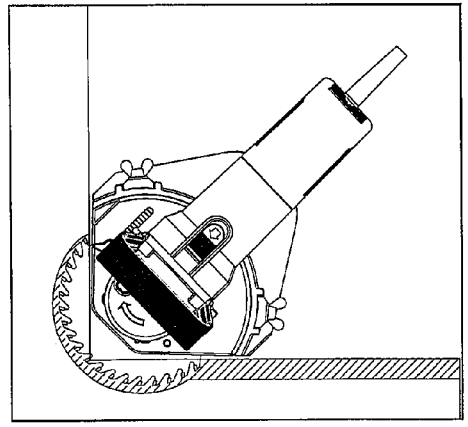
Figure 4:
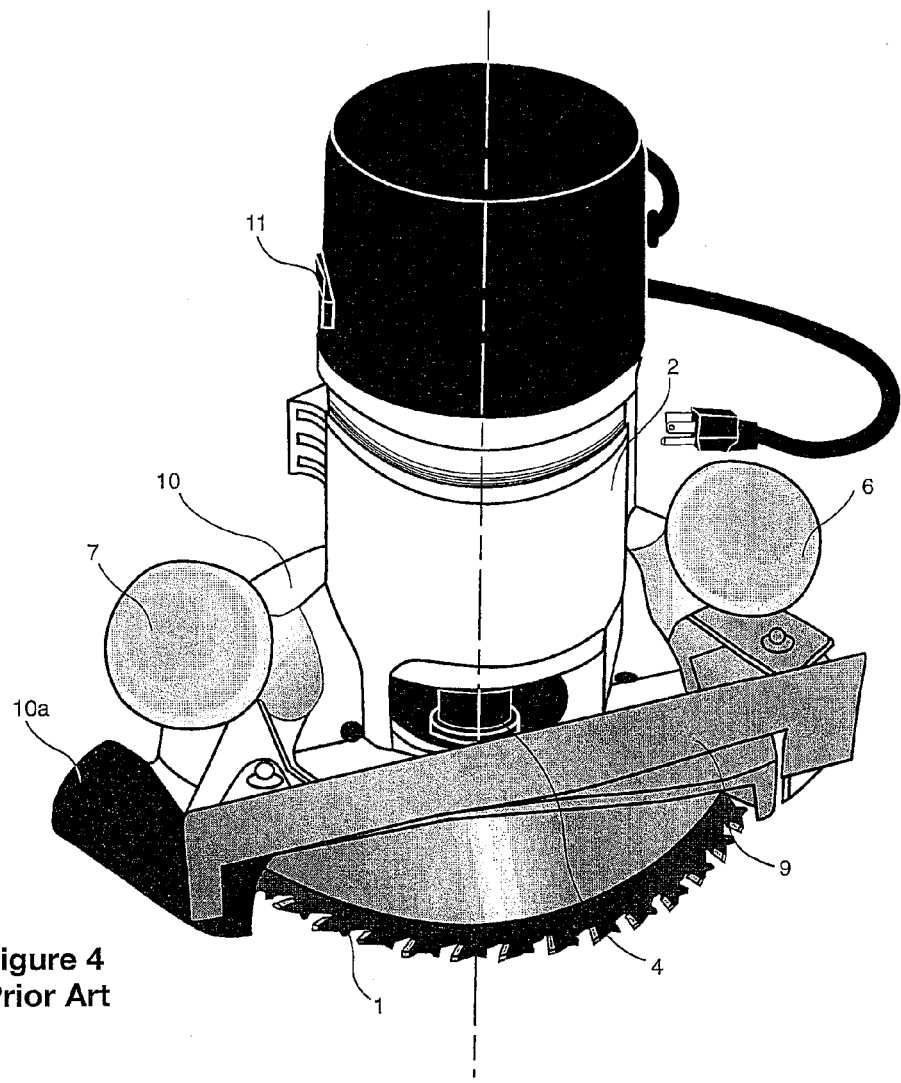
FIG. 4 is a perspective view of a direct drive shaft device having only a armature shaft and no spindle shaft.
Figure 4A:
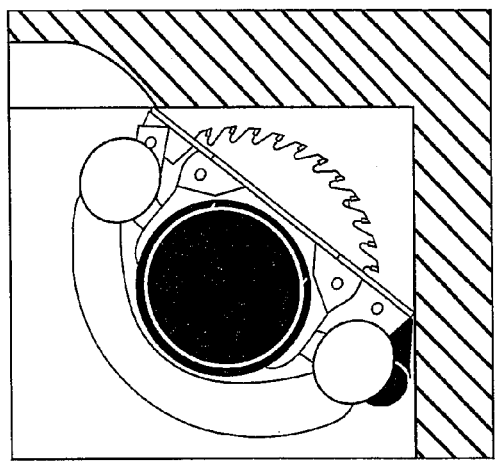

A second aspect of the invention is the use of an improved dust port. In the prior art saw of FIG. 4, a dust port 10a is a protrusion from the left side of fixed guard 10 that prevents the saw from undercutting inside corners. The current design couples the dust port with a dust channel that extends along the bottom underside of the fixed blade guard. Again this improvement, although illustrated in one specific set of embodiments, may be adapted to any undercut saw in which a fixed blade guard is used.

A third aspect of the invention is the use of a pair of ergonomic handles. The use of a pair of such handles allows optimal control of the undercut saw, while also being comfortable for the user.

A fourth aspect of this invention is the use of a depth gauge that while controlling the depth of cut to be made also positions the saw for optimal use of its dust control port.

A fifth aspect of this invention is the use of a housing with a motor having a shaft which is mechanically coupled to a spindle gear in parallel axial alignment, where said housing has attached to it a fixed blade guard with circumscribes less than 180 degrees of the circumference of the saw blade.

In any of the above described aspects of the invention, a number of different configurations may be adapted. For example, the blade mount may be positioned at the terminal end of the drive shaft (i.e. a direct drive configuration) or a spindle shaft may be rotated by the drive shaft. The gears on the spindle shaft may engage the gears on the drive shaft such that the drive and spindle shafts are either at a parallel or perpendicular orientation. A direct drive configuration is not preferred because the motors have a tendency to bog down and overheat, reducing the life of the tool. The perpendicular drive and spindle shaft is also not preferred. Parallel drive and spindle shafts allow use at lower RPM and have greater torque compared to other configurations. A parallel drive and spindle shaft may be used in any of the above configurations.

Further, it is preferred that a depth gauge is used with this tool. It is further preferred that the depth gauge be easily removable so that it is not an impediment to undercutting inside corner areas. It is further preferred that this depth gauge have more than one operating surface to position the saw at optimal angles for either a) ergonomic concerns or b) optimal use of the dust control port.

As used herein "undercut saw" is limited to a specific device that is able to move along a wall and undercut the wall at a specific height limited by the height of a fixed blade guard. An undercut saw must include: 1. a tool housing, 2. a motor contained within this housing, 3. a shaft mechanically linked to said motor such that said motor rotates said shaft, 4. a blade mount mechanically linked to said shaft such that a blade mounted on said blade mount is parallel to the floor when the tool is in use, and 5. a fixed blade guard, as defined below. Undercut saws would include either direct drive saws, which are saws with a drive shaft having a blade mount directly at the terminal end of said drive shaft, or a saw having a drive shaft which by means of mechanical linkage turns a separate spindle shaft. Such drive shafts and spindle shafts may be in parallel or perpendicular orientation.

As used herein "fixed blade guard" is a tool structure that circumscribes a portion of the circular saw blade. The fixed blade guard includes a top face with a downwardly protruding semi-circular outside edge, which fits within a second semi-circular skirt. The outside edge of the blade guard fits within the inside edge of the skirt in a telescoping manner, which provides a means of height adjustment. The fixed blade guard in combination with the skirt when viewed from the top provides a continuous structure that circumscribes a portion of the blade. The bottom face of the skirt provides a flat surface on which the saw may rest when resting on a flat surface and when moving over that surface during cutting.

As used herein "ergonomic handles" is a pair of U-shaped handles, attached or extending from the housing at an upper and lower location, although a handle may be equally effective if attached in only one of said upper or lower locations. These handles are positioned one on each the left and right side of the tool. Such handles allow the user to position his hands such that the user's fingers extend around an elongate handle surface. When the tool is gripped by the user, the user's fingers curl around the elongate surface in one direction and the user's thumb curls around the elongate handle surface in the opposite direction.

When the tool is on a flat surface and one ergonomic handle is gripped by a user, the index fingers of the user are further from the flat surface and tool blade than the user's pinky fingers. The attachment of the handle at two locations on the housing provides optimal stable control of the tool. In ergonomic handles the trigger switch is positioned on the handles such that a user can use one or more fingers to switch the device on or off.

Figure 5A:
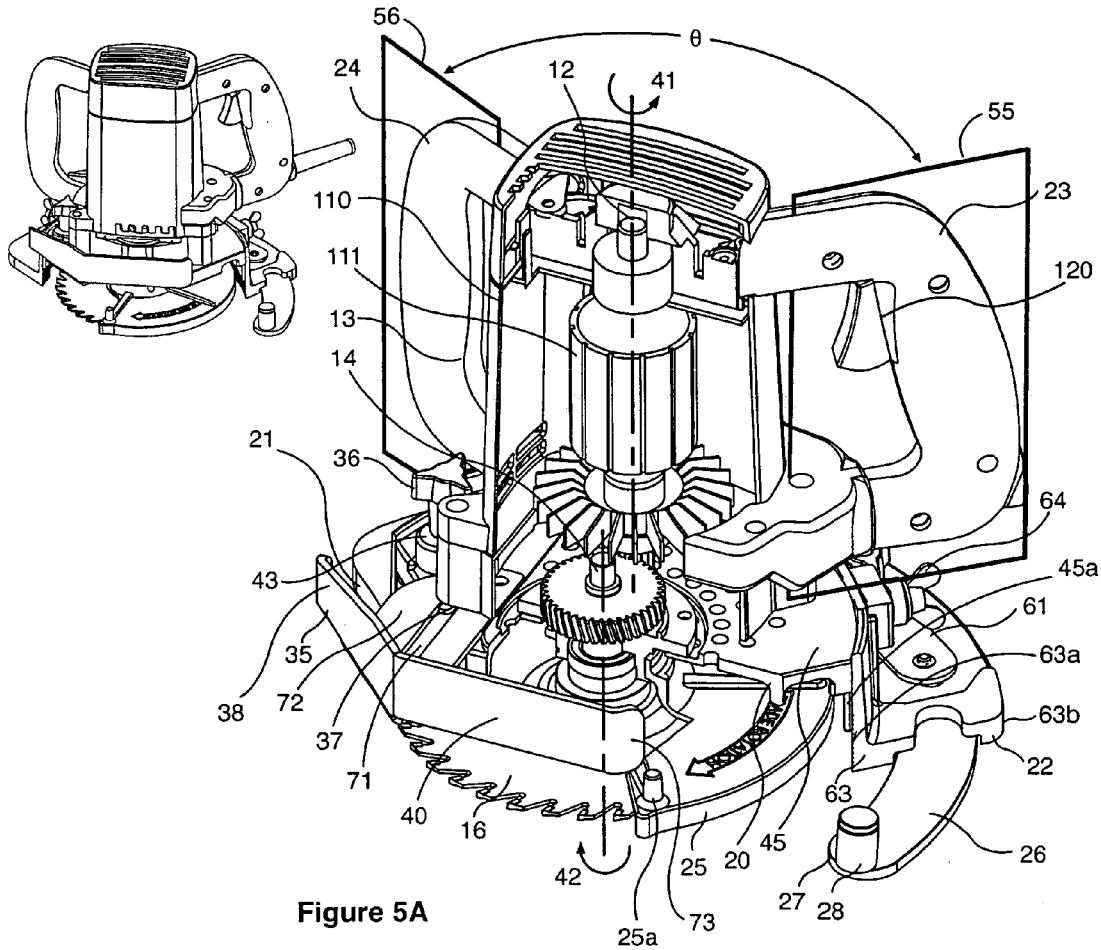
FIG. 5A is a perspective view of the preferred embodiment of the undercut saw of this invention with a partial cutaway of the housing and the fixed blade guard to show internal mechanisms.

With reference to FIG. 5A one illustrative embodiment is shown. In this embodiment, housing 110 contains a motor 111. The motor drives armature drive shaft 12 rotating the shaft in the direction of arrow 41. A gear at the distal end of armature drive shaft 12 engages a gear on spindle shaft 14. This produces rotation in the direction of arrow 42. A blade mount (not visible) at a distal end of spindle shaft 14 allows circular saw blade 16 to be mounted on spindle shaft 14. The blade mount is a separate part which in conjunction with a fastener mechanically couples the blade to spindle shaft 14.

Mounted on housing 110 are handles 23, 24. The angle θ separates handles 23, 24.

Circumscribing a portion of the blade is a fixed blade guard 20. Blade guard 20, as shown, circumscribes less than 180 degrees, and preferably allows exposure of between 190 and 220 degrees of the circumferential saw blade. This allows undercutting of inside corner areas. The fixed blade guard is comprised of top plate 45 and attached height adjustment skirt 63.

Extending about top plate 45 is height adjustment skirt 63. Skirt 63 is L shaped in cross section and is comprised of a semi-circular vertical face 63a which encloses a semi-circular downwardly protruding back edge 45a of fixed guard 45. These two semi-circular parts form a telescoping structure that provides a means of height adjustment. Horizontal face 63b provides a surface for the tool to rest level on a surface. When the tool is moved over a floor, the underside of face 63b is the surface in contact with the floor.

Figure 8:
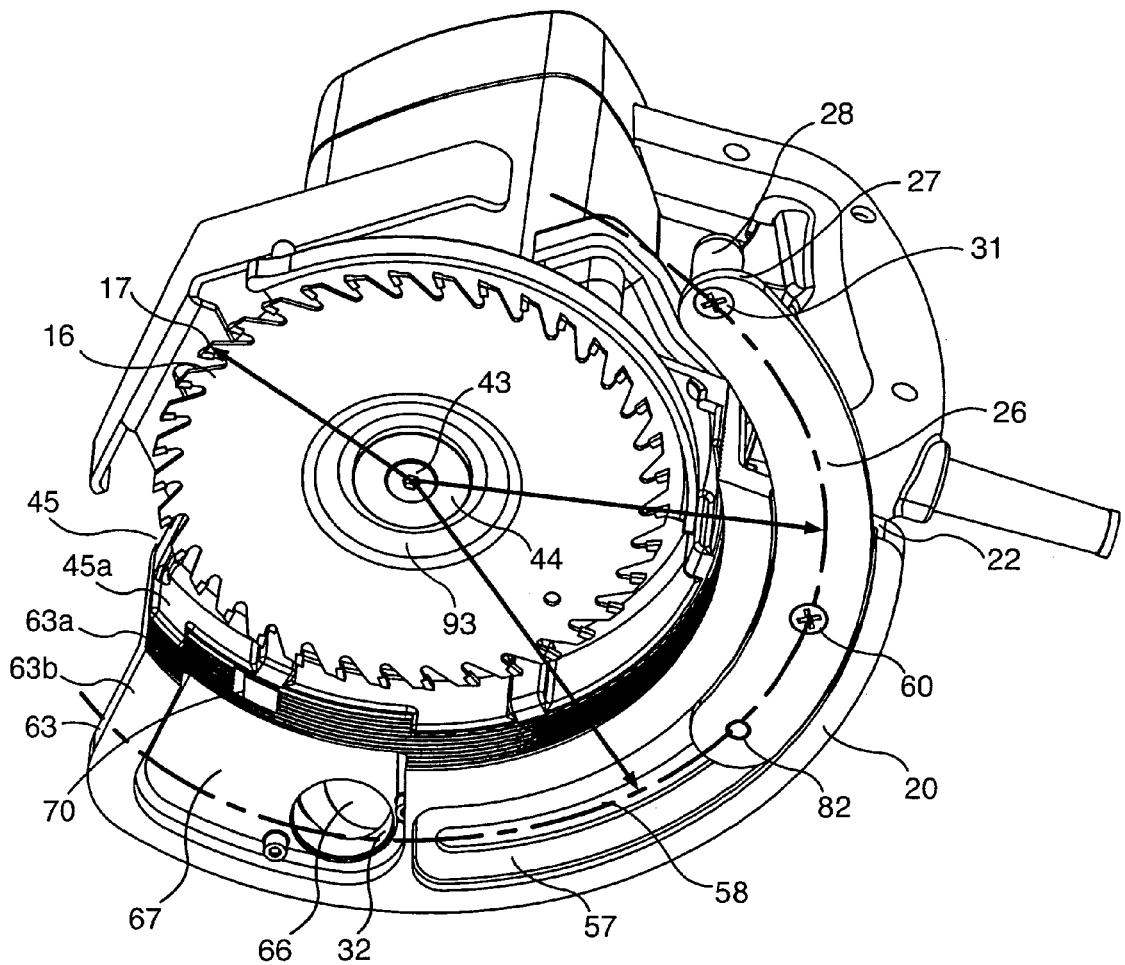
FIG. 8 is a bottom view of the undercut saw.

At a plurality of locations on skirt 63 (one shown in FIG. 5A) a plurality of nuts 64 are fastened to bolts that extend through the downwardly protruding back edge of fixed guard 45, and as shown in FIG. 8, through a slot 70 on face 63a. The slot of face 63a allows height adjustment of plate 45 with respect to face 63b, thereby bringing blade 16 closer or farther from a floor surface on which face 63b rests. The bolts extend through the underside of fixed guard 45 through its downwardly protruding back edge 45a, as showing in FIG. 8. Greater or lesser cutting heights may be required depending on the flooring to be installed (for example tile versus linoleum).

As shown in FIG. 5A, joined to fixed blade guard 20 is retractable blade guard 25. Retractable blade guard 25 covers the circumference and top portion of the blade, and may retract into fixed blade guard 20 during cutting. A pin 25a on retractable blade guard 25 allows a user to manually push back retractable blade guard. This guard acts to both protect the blade when the tool is not in use and protect the user and surfaces if the tool is activated when cutting is not desired. As shown in FIG. 5D, when fully extended the retractable blade guard covers most of the blade that is exposed by the fixed blade guard. This preferably includes the frontmost portion of the blade. Retractable blade guard 25 is spring mounted on fixed blade guard 20 such that it is ordinarily biased in its extended position to a location over the blade section protruding from fixed blade guard 20. When the tool is activated and moved against a wall, retractable blade guard is rotated into fixed blade guard 20.

On one side of skirt 63, a stabilization bar 26 is shown extending from skirt 63. At an end section 27 of stabilization bar a bumper 28 is positioned. Skirt 63 includes a leading edge 21 and a trailing edge 22. In the present embodiment, the stabilization bar is shown extending from trailing edge 22, although the tool could use a stabilization bar on either or both sides. Stabilization bar 26 is joined to plate 61 to create a sliding assembly that provides adjustment of the extension of stabilization bar 26, as will be explained in later figures.

As shown in FIG. 5A, depth gauge 35, mounted on surface 45 allows a user to select the depth of cut that is created by blade 16. A slot 71 in gauge 35 is mounted on a boss 37 on surface 45. A bolt with a three-armed head 36 may be screwed into a tapped hole in a protrusion 43 of housing 110. Bolt 36 may be extended into contact with a surface 72 of depth gauge 35, securing depth gauge 35 in a fixed position. Depth gauge 35 includes a first operating surface 38 and a second operating surface 40.

Figure 10:
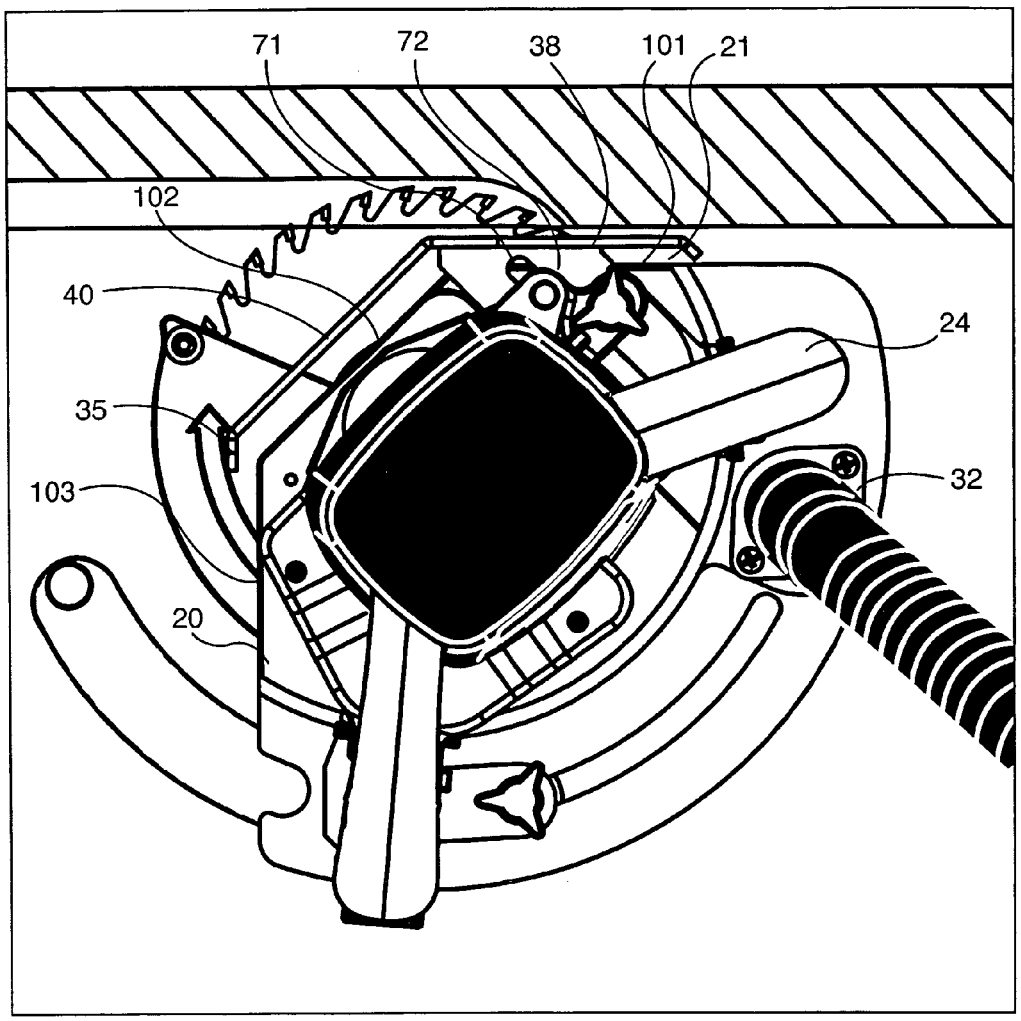
FIG. 10 is a top view of the tool of FIG. 5A shown undercutting a wall with a dust control vacuum hose attached to it.

When used herein in the discussion of a depth gauge, the term "operating surface" refers to a surface of the depth gauge which is designed to contact the wall being undercut in order to set a depth of cutting. As shown in FIG. 10, depth gauge 35 is located such that its operating surface 38, when flush against a wall being undercut, positions the saw in a manner that provides optimal dust collection using dust control port 32. This location is optimal because the leading edge 21 of fixed guard 20 is positioned as close as possible to a wall surface where the blade is exiting from the cut. This helps fixed guard 20 capture as much dust as possible. Dust control port 32 is located as close as possible to leading edge 21 in order to provide maximum suction in this area.

Figure 5B:
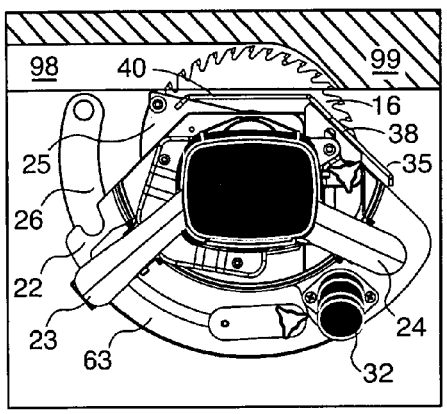
FIG. 5B is a top view of the tool of FIG. 5A in use as a wall is undercut.

In a preferred embodiment, depth gauge 35 may comprise two surfaces, as shown in FIG. 5B. As previously discussed, first operating surface 38 is for dust control. If the user does not own the required vacuum, dust control port 32 may not be used. In such case, second operating surface 40 provides depth control in a manner that positions handle 24 in a more comfortable position for the user. The reason surface 40 may produce greater comfort for the user is as follows: when surface 38 is used for dust control, as shown in FIG. 10, handle 24 nearly contracts a wall surface, providing little clearance for knuckles or wrists. However, when surface 40 of depth gauge 35 is flush against a wall surface, additional hand clearance is available as shown in FIG. 5B.

Figure 9:
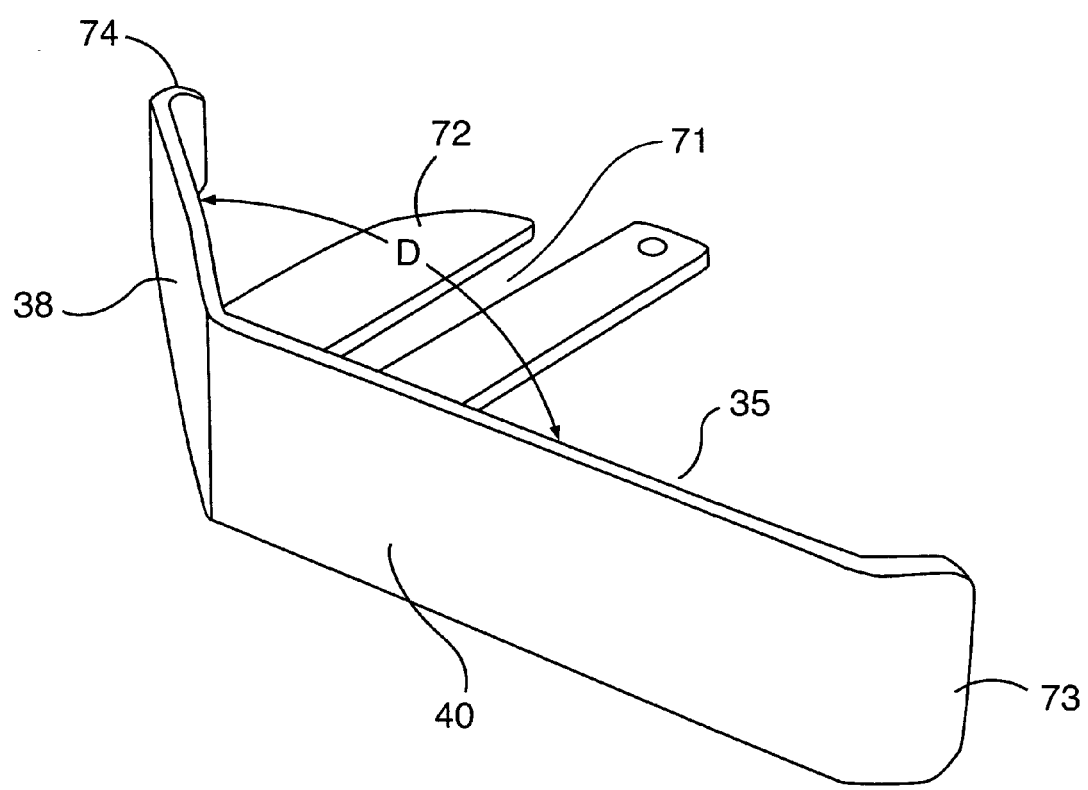
FIG. 9 is a perspective view of the depth gauge.

As shown in FIG. 9, first operating surface 38 of depth gauge 35 is at an angle "D" which is substantially less than 180 degrees in relation to second operating surface 40. In a presently preferred embodiment of depth gauge 35, angle "D" is approximately 135 degrees. However, angle "D" may be any angle providing ergonomic benefit, such as between 90 degrees and 179 degrees. Surfaces 38 and 40 may provide benefits in other embodiments of this saw that do not include dust control port 32. Use of the saw at the angle provided by surface 38 still gets fixed guard 20 closer to the wall, thereby reducing the amount of dust that is thrown. However, some users may not be concerned about dust at all, and therefore prefer the ergonomic benefits of using surface 40.

Operating surfaces 38 and 40 of depth gauge 35 may comprise two separate depth gauge assemblies complete with their own lock nuts by means of which they may be individually adjustable, or they may be two surfaces of a single piece of material formed to the desired shape, this being a presently preferred embodiment of this invention, which is shown in FIG. 9. The depth gauge may be a single straight piece of material removably and/or adjustably coupled to the fixed blade guard functioning primarily in order to take maximum advantage of a dust control port.

Embodiments of the depth gauge are further disclosed in U.S. patent application Ser. No. 09/976,483.

Figure 5C:
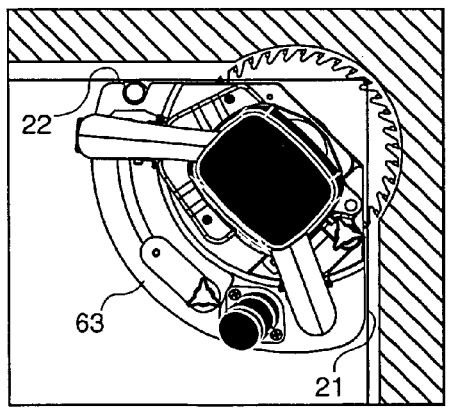
FIG. 5C is the undercut saw of FIG. 5A which shows the device in operation at an inside corner area.
Figure 5D:
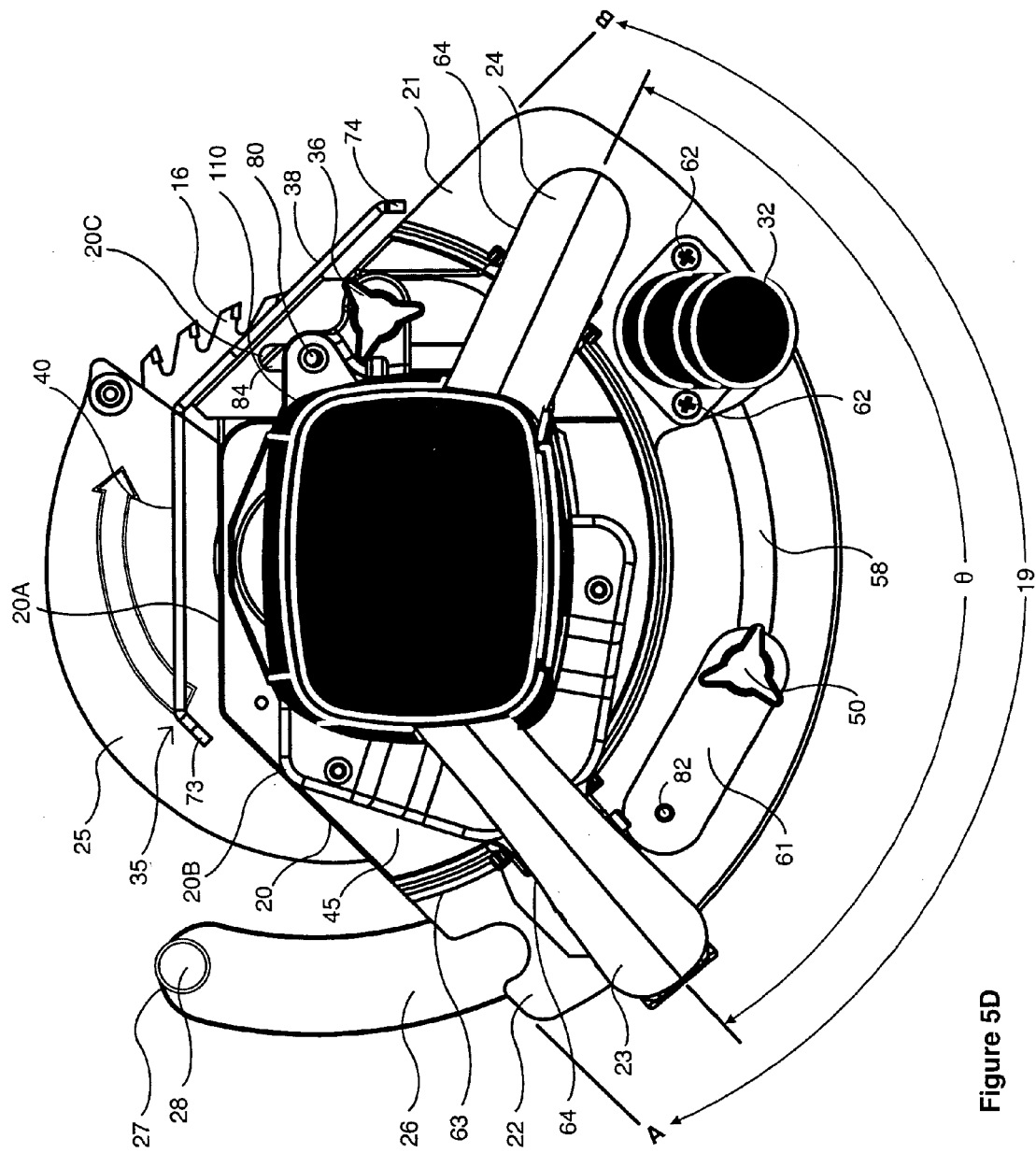
FIG. 5D is a top view of the tool shown in FIG. 5A.

The tool in use is illustrated in FIG. 5B with the top view showing blade 16 cutting into wall 99 to leave a cut 98. The depth setting made by depth gauge 35 determines the depth to which blade 16 will penetrate into a wall being undercut. As blade 16 begins to cut into the wall and is moved along the wall, retractable blade guard 25 is pushed into the illustrated position. Stabilization bar 26 is extended from skirt 63 to provide stability to the device. The device is propelled by a user gripping handles 23, 24. When an inside corner is cut as is shown in FIG. 5C, the stabilization bar may be retracted. In addition, depth gauge 35 may be removed to facilitate undercutting in this area. Thus leading edge 21 and trailing edge 22 of skirt 63 come flush with both walls forming the corner and the circumference of blade 16 reaches maximum depth. The combination of greater than 180 degrees of the circumference of blade 16 being exposed and the lack of an unnecessary protrusions at leading edge 21 or trailing edge 22 is necessary in order to fully undercut the inside corner.

With reference to FIG. 5D, the top view illustrates stabilization bar 26 extending from skirt 63 at a location of a trailing edge 22. At a distal tip 27 on stabilization bar 26, a bumper 28 is positioned. Bumper 28 extends upward a sufficient distance such that stabilization arm 26 does not extend underneath the undercut area of the wall. Bumper 28 prevents stabilization bar 26 from becoming lodged in an area that was already undercut by the blade, which could immediately halt the saw and create a potential safety hazard. To perform this function, it is preferred that bumper 28 is taller than the thickness of the stabilizer and also the maximum height of cut of the saw. Furthermore, bumper 28 must extend beyond a forward edge 27 of stabilization bar 26 such that no forward edge may enter an area that has been previously undercut.

In a presently preferred embodiment of this invention, bumper 28 is capable of rotating. This is so it will not scratch or scuff wall surfaces. As shown in FIG. 8, bumper 28 is mounted on stabilization bar 26 using the shaft of screw 31 as an axle. Likewise, in a presently preferred embodiment, bumper 28 is made of a resilient, non-scuffing substance such as, a natural, semi-synthetic or synthetic polymer such as, rubber, Teflon®, or the like. It may also be a non-polymeric material such as wood or metal. Bumper 28 may also be formed simply by an upward bend of stabilization bar 26 at a distal tip 27. As shown in FIG. 5D, stabilization bar 26 is mounted to skirt 63 by means of top mounting plate 61. As shown in FIG. 8, stabilization bar 26 runs within a curved raceway 57. A rivet 82 and bolt 60 run through curved slot 58 which is then fastened to the mounting plate on the top side of skirt 63. As shown in FIG. 5D, rivet 82 is a permanent fastener, but bolt 60 provides a threaded stud which accepts tapped three-arm nut 50. Three-arm nut 50 may be tightened down onto plate 61 to frictionally hold stabilization bar 26 in a fixed position. Three-armed nut 50 may then be loosened to retract or further extend the stabilization bar. Also on skirt 63 is dust port 32 secured by screws 62.

FIG. 5D shows a top view of the complete assembly of fixed guard 20. Fixed guard 20 has top surface 45. As previously discussed, skirt 63 is adjustably mounted to fixed guard 20 by way of nuts 64 (not visible but directly underneath handles 23, 24). The contour of the front edge of fixed guard 20 allows exposure of greater than 180 degrees of the circumference of blade 16. It is preferred that somewhere between 190 degrees and 210 degrees of the blade be exposed. This provides the optimum amount of blade exposure to allow cutting at inside corner locations. Fixed blade guard 20 has a front surface 20A and side surfaces 20B, 20C. These surfaces are shown as each having a straight line angle. However, it is possible that the surfaces also could be a curved arc. Greater than 180 degrees of the circumference of blade 16 is thus allowed to be exposed by this contour. Depth gauge 35 has first operating surface 38 for use with dust control port 32, and second operating surface 40 which provides better ergonomics when dust control port 32 is not used. Contours 73, 74 at both distal ends of depth gauge 35 are angled away from their respective operating surfaces 40, 38 to prevent and sharp edge from potentially scratching a wall being undercut. Operating surfaces 38, 40 are essentially as wide as surfaces 20A and 20C of fixed blade guard 20. When undercutting at an inside corner area, depth gauge 35 is removed so that it creates no obstructions.

Figure 6A:
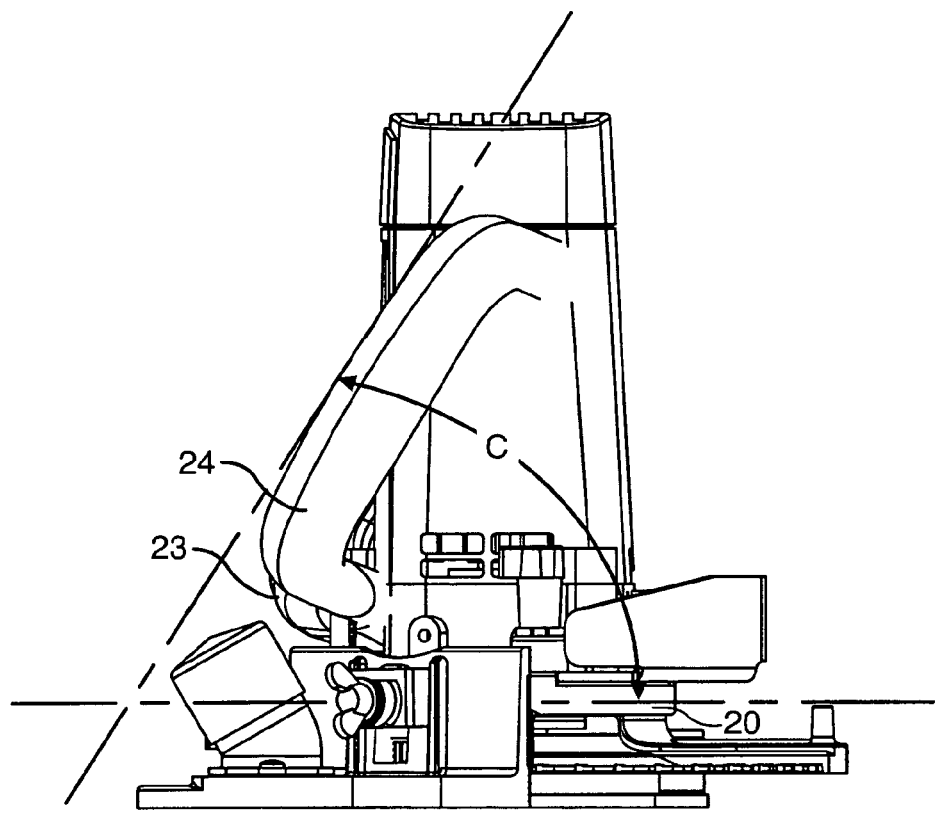
FIG. 6A is a side view of an alternative embodiment of an undercut saw having forward leaning handles.
Figure 6B:
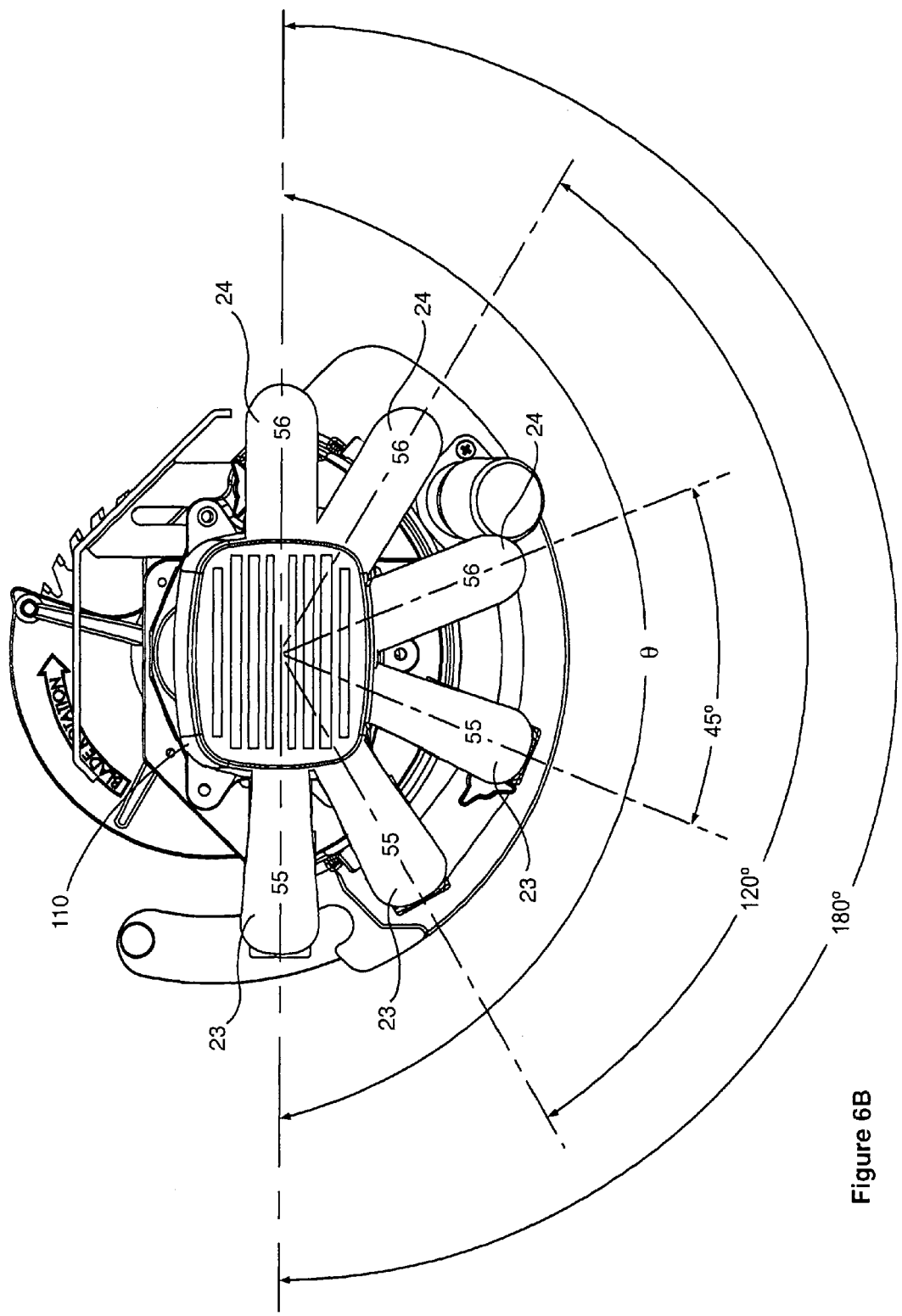
FIG. 6B is a top view of showing other alternative embodiments of the undercut saw specifically in relation to the angle formed between the handles.

As shown in FIG. 6B, attached to housing 100 are handles 23, 24. Handles 23, 24 are separated by angle $\theta$. Angle $\theta$ may be anywhere from 45 degrees to 180 degrees. This positioning of the U-shaped handles on the sides of the housing allows efficient control of the saw for sideways motion. Handle positioning aligned at lines 55, 56 show handles separated by 45°, 120° and 180°. These placements are representative and any angular placement between 45° and 180° is acceptable.

As shown in FIG. 5D, the radial distance between leading edge 21 and trailing edge 22 is an arc between point A and point B designated by numeral 19. This arc is preferably less than 170 degrees.

Figure 6C:
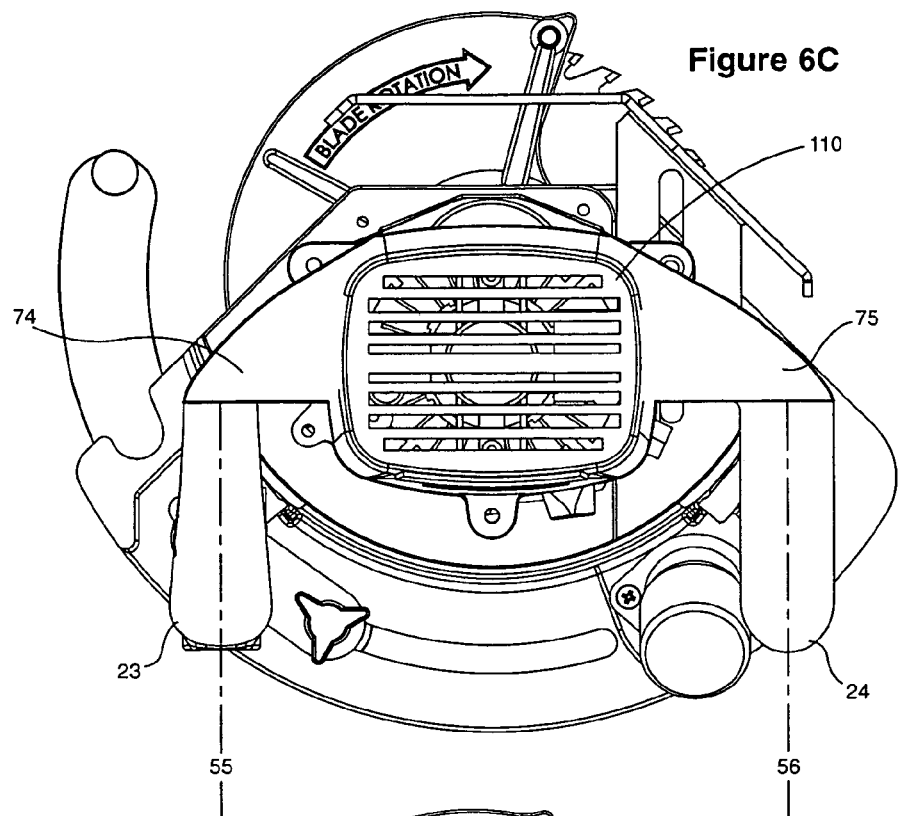
FIG. 6C is a top view showing an alternative embodiment with a different means of joining the handles to the motor housing, with the handles being parallel to each other.
Figure 6D:
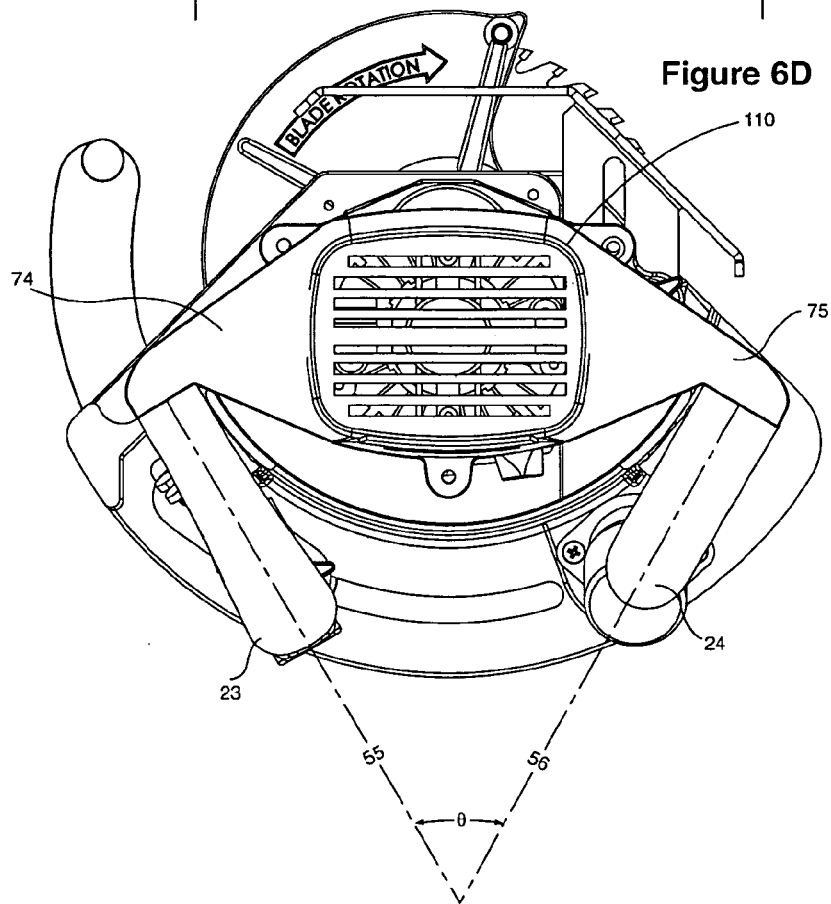
FIG. 6D is a top view showing an alternative embodiment with a different means of joining the handles to the motor housing, with the angle formed between the handles being less than 180 degrees.

As shown in FIG. 5A, handles 23, 24 are substantially perpendicular to top flat surface 45 of fixed gauge 20. However, other similar configurations of ergonomic handles are possible. With reference to FIG. 6A a forward tilt positioning of handles is shown. As shown in FIG. 6A the handle is angled forward towards the front of the device at an angle C. Any angle between 179 degrees and one degree in the direction of angle C may be considered ergonomic. Similarly with regard to FIG. 6B any angle $\theta$ between 180 and 45 degrees for side to side separation of the handles may be acceptable. In addition the handles may be positioned in various designs such as those shown in FIGS. 6C, 6D. To be ergonomic, handles 23, 24 need not be at an angle in relation to each other, and need not be directly attached to the motor housing. In FIG. 6C, the centerlines of handles 23, 24 are parallel, not at any angle, and housing 110 has separate extenders 74, 75 which provide points of attachment for handles 23, 24. In FIG. 6C, the same extenders 74, 75 are employed, but the handles 23, 24 have centerlines 55, 56 that are angled back towards a user. In any of these embodiments the power cord for the device is preferred to extend into the handle and the switch is positioned such that when the handle is gripped, the user's index finger is positioned over the trigger switch 120, as shown in FIG. 5A. In other embodiments other fingers or multiple fingers can grip the switch. In ergonomic handles the switch must be positioned on the handle so that it can be easily actuated by the user.

Figure 6E:
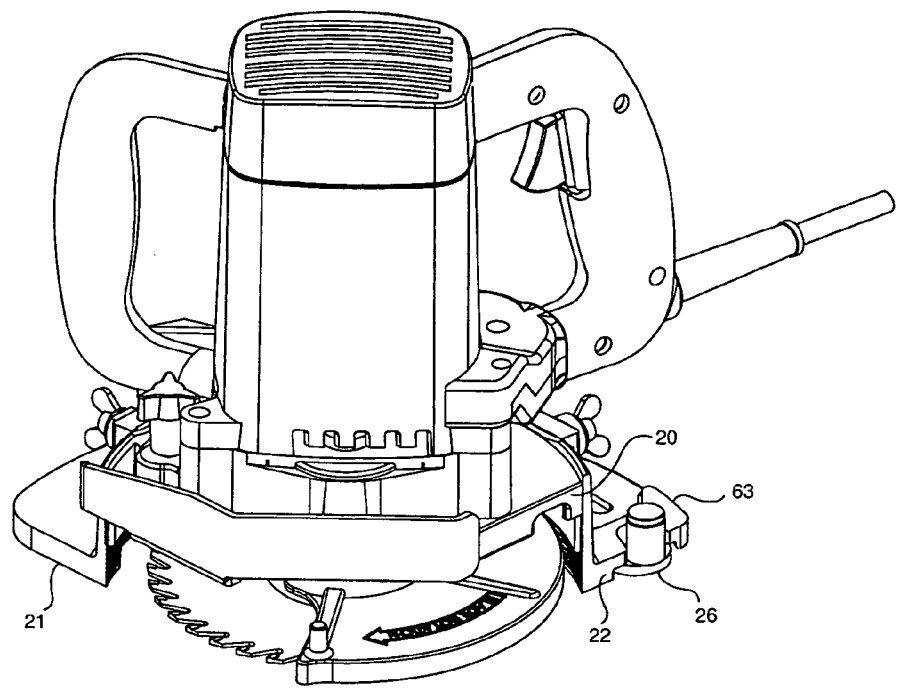
FIG. 6E is a perspective view of the undercut saw of the present invention with the stabilization bar retracted.
Figure 6F:
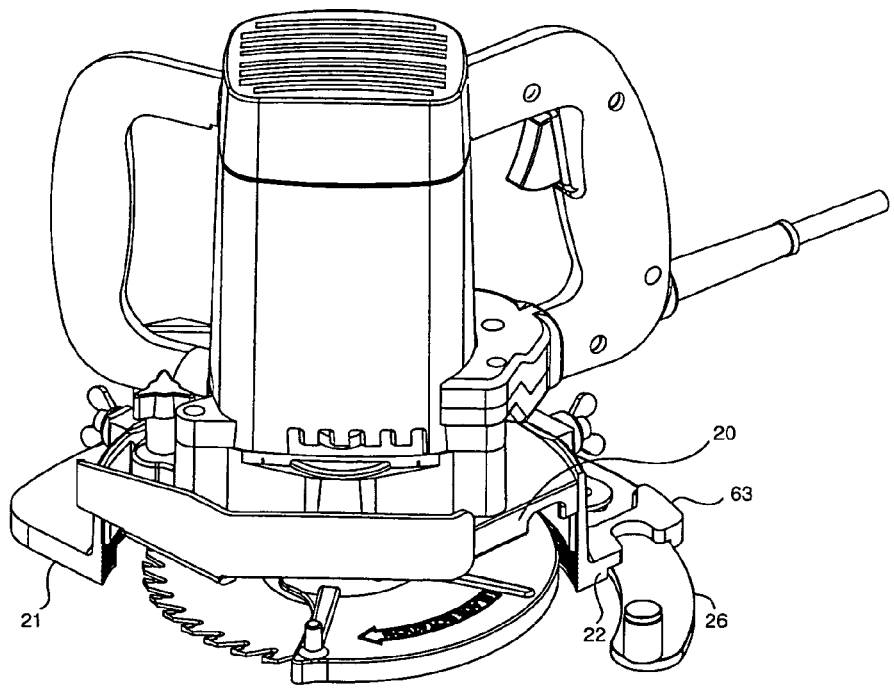
FIG. 6F is the perspective view of FIG. 6E with the stabilization bar extended.
Figure 7A:
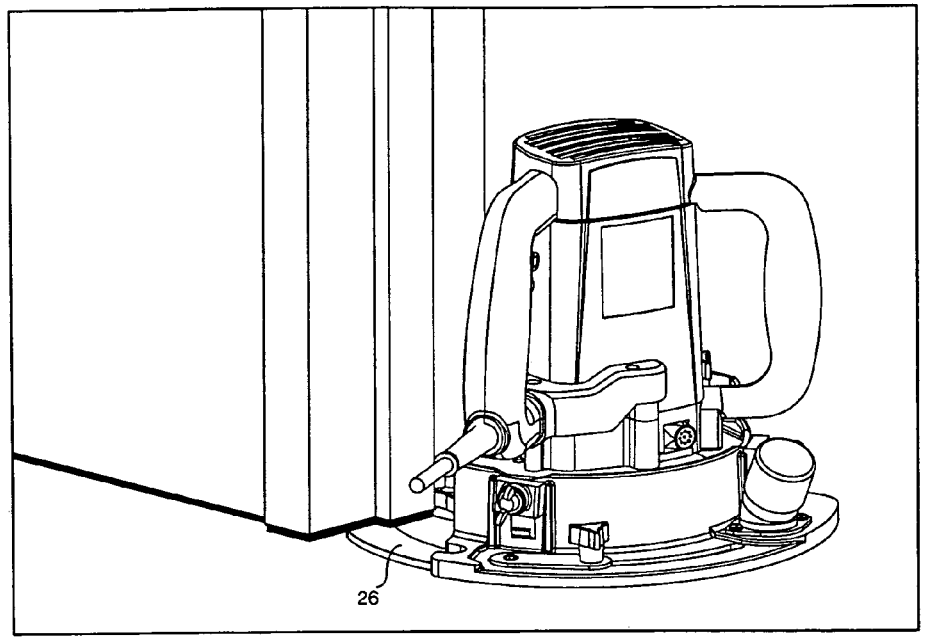
FIG. 7A is a perspective view of the undercut saw of the present invention, which shows the stabilizer lodged in an area that was previously undercut.
Figure 7B:
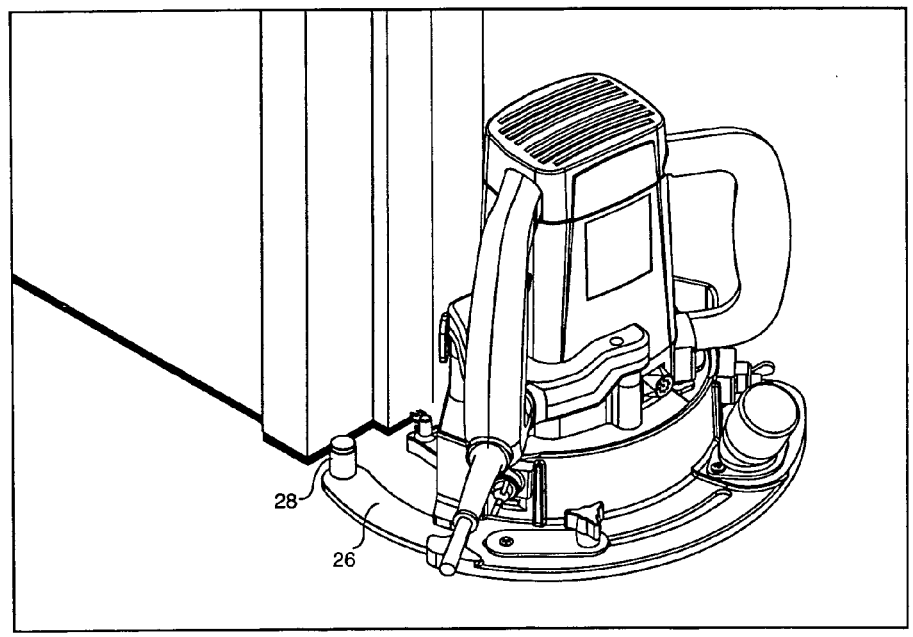
FIG. 7B is a perspective view of the undercut saw of the present invention, which shows how the bumper prevents the stabilizer from becoming lodged in an area previously undercut.

With reference to FIGS. 6E, 6F, the stabilization bar 26 is shown either retracted (FIG. 6E) or extended (FIG. 6F). The stabilization bar extends from skirt 63. The leading edge 21 and trailing edge 22 are shown with the stabilization bar 26 extending from the trailing edge 22. Having the stabilization bar 26 extend from trailing edge 22 is preferred because it does not hinder the progress of the saw as the user approaches the inside corner. However, in other embodiments, stabilization bar 26 could extend from leading edge 21 and still be effective in reducing tipping. FIGS. 7A, 7B show the use of stabilization bar 26 without the bumper (as shown in FIG. 7A) and with the bumper 28 (as shown in FIG. 7B). Bumper 28 prevents stabilization bar 26 from extending underneath the cut that has been made in a wall. If stabilization bar 26 wedges in the cut the saw could unexpectedly halt, creating a safety hazard.

With reference to FIG. 8 the underside of the tool illustrates a number of features. Circular saw blade 16 is coupled to the spindle shaft by a flat head mounting screw 43 secured over a mounting clamp 44 that fits into recess 93 on blade 16. This particular blade mount provides a mounting means which is a flush as possible with the bottom surface of blade 16, allowing blade 16 to cut as close to flush as possible to a floor surface. This is necessary when the floor to be installed is very thin, such as vinyl.

Skirt 63 includes an radial slot 58 and a raceway 57. Extending through slot 58 are bolt 60 and rivet 82. On the other side these bolts are secured into a plate on the top side of skirt 63. The main body of stabilization bar 26 thus may move in an arc along raceway 57 on skirt 63. This allows stabilization bar 26 to be moved in this arc fashion to extend the stabilization bar to a lesser or greater degree. At a distal end of stabilization bar 36, screw 31 secures bumper 28 to stabilization bar 26 in such a manner that bumper 28 may rotate on the axis of stud 31, preventing scuffing or scratching of a wall surface.

Also on skirt 63 is through-opening 66 over which dust control port 32 may be mounted. A dust port channel 67 on skirt 63 provides a means for dust to move to through-opening 66 and out dust control port 32. As shown in FIG. 5D, a vacuum source may be attached to dust control port 32 to provide efficient dust removal. A cap for dust control port 32 (not shown) may be provided to prevent dust from exiting dust control port 32 when dust control port 32 is not in use.

With reference to FIG. 10, depth gauge 35 has a first operating surface 38 which positions the fixed guard of the saw as close to a wall surface as possible. This is advantageous when the dust control port is in use, because it causes fixed guard 20 to capture and direct dust towards the dust control port. As shown in FIG. 5B, second operating surface 40 provides ergonomic benefits. If the dust control port is not in use, surface 40 does not position the saw so closely to the wall, creating greater knuckle clearance for fingers gripping the ergonomic handles. As shown in FIG. 9, the two operating surfaces together form angle θ which may be anywhere from 110 degrees to 170 degrees but is preferably around 135 degrees. Depth gauge 35 also has slot 71 which fits over a boss on the fixed blade guard and surface 72 which is the location where a threaded stud may press and frictionally hold depth gauge 35 and a fixed position.

As shown in FIG. 10, the fixed blade guard 20 also has a first operating surface 102, a second operating surface 101 and a third operating surface 103. The depth gauge 35 may be removed at the option of the user. If this were done the tool would cut to the depth of the blade exposed by the fixed blade guard as limited by operating surfaces 101, 102 or 103. As with the depth gauge, the fixed blade guard operating surfaces give the user a number of options when using the tool. As shown in FIG. 10, second operating surface 101 on the fixed blade guard is shown in use as parallel to the wall being undercut. This minimizes the gap between the wall and the opening into the fixed blade guard. Dust generated during undercutting of the wall will tend to be swept by the blade into the circumscribed area of the fixed blade guard. If a dust port 32 is part of the fixed blade guard, this operating surface will allow this port to operate at optimum dust collection efficiency. For this reason the second operating surface 101 would be considered a "dust port optimized operating surface", defined as an operating surface on the fixed blade guard that minimizes the distance between where the blade exits the wall during cutting operation and where the blade enters the fixed blade guard. In the illustrated embodiment, the depth gauge also has a first operating surface 38 and a second operating surface 40. These provide similar advantages as the fixed blade guard operating surfaces. The user can select to use the tool either with or without the depth gauge, allowing selection of depth limitation or tool use with maximal depth cutting. In either instance, the dust port optimized operating surface 101 can be used by cutting with this surface parallel to the wall to maximize the effectiveness of the dust port. By attaching a vacuum to dust port 32 the effectiveness is further enhanced. If dust creation is not an issue, operating surface 102 may be used as the surface parallel to the wall during cutting. This surface may be preferred if dust is not an issue and the user feels more comfort and control using this surface.

We claim:

1. An undercut saw configured to cut a substantially vertical wall surface while a fixed blade guard moves across a substantially horizontal floor surface on which said undercut saw is placed, said undercut saw comprising:
    a housing;
    at least one handle on said housing,
    a motor housed within said housing;
    a drive shaft rotated by said motor;
    a circular saw blade mount mechanically linked to said drive shaft such that when said drive shaft is rotated by said motor, said blade mount is rotated such that when a circular saw blade is mounted on said blade mount, said circular saw blade is rotated;
    a fixed blade guard joined to said housing, said fixed blade guard circumscribing a portion of a circular saw blade when it is mounted on said blade mount;
    a depth gauge mountable on said fixed blade guard; and
    a retractable stabilization bar mounted on said fixed blade guard separately from said depth gauge, said retractable stabilization bar extendable from at least one end of said fixed blade guard, said retractable stabilization bar including a bumper at an end of the retractable stabilization bar, said bumper being a cylinder that is rotatably coupled at an end of the stabilization bar;
    wherein when said undercut saw blade is mounted on said blade mount, and said blade, said fixed blade guard, and said depth gauge are not in contact with said substantially vertical wall surface, said retractable stabilization bar prevents tipping of said undercut saw by contacting a substantially horizontal floor surface; and wherein said retractable stabilization bar will retract at least as far into said blade guard that the end of said retractable stabilization bar is flush with an outer edge from which it may extend from said fixed blade guard.

2. An undercut saw configured to cut a wall surface substantially vertical in relation to a substantially horizontal floor surface on which the undercut saw is placed, the undercut saw comprising:

a housing;

at least one handle on said housing, a motor housed within said housing;

a drive shaft rotated by said motor;

a circular saw blade mount mechanically linked to said drive shaft such that when said drive shaft is rotated by said motor, said blade mount is rotated such that when a circular saw blade is mounted on said blade mount, said circular saw blade is rotated;

a fixed blade guard joined to said housing, said fixed blade guard circumscribing a portion of a circular saw blade mounted on said blade mount, said fixed blade guard including:

a top plate fixedly connected to said housing;

a height adjustment skirt in telescoping attachment to said top plate, said height adjustment skirt having a horizontal surface substantially parallel to said saw blade when said blade is mounted into said blade mount, wherein said horizontal surface contacts a floor surface on which said undercut saw is placed when said saw is in use;

a depth gauge mountable on said top plate; and a retractable stabilization bar that extends from and retracts into one side of said height adjustment skirt and is movable independently of the depth gauge, said retractable stabilization bar including a bumper at an end of the retractable stabilization bar;

wherein when said undercut saw blade is mounted on said blade mount, and said blade, said fixed blade guard, and said depth gauge are not in contact with said substantially vertical wall surface, said retractable stabilization bar prevents tipping of said undercut saw; and wherein said stabilization bar will retract at least as far into said blade guard that the end of said stabilization bar is flush with an outer edge from which it may extend from said fixed blade guard.

* * * * *